United States Patent [19]

Semff

[11] Patent Number: 4,957,585
[45] Date of Patent: Sep. 18, 1990

[54] HIGH PRESSURE LAMINATION CHAMBER

[75] Inventor: Louis R. Semff, Plano, Tex.

[73] Assignee: Texas Instruments Incorporated, Dallas, Tex.

[21] Appl. No.: 300,750

[22] Filed: Jan. 23, 1989

Related U.S. Application Data

[63] Continuation of Ser. No. 103,082, Sep. 30, 1987, abandoned.

[51] Int. Cl.⁵ .............................................. B32B 31/20
[52] U.S. Cl. ...................................... 156/382; 156/500; 249/65; 425/339; 425/342.1; 425/405.2
[58] Field of Search ............... 156/381, 382, 212, 214, 156/228, 242, 245, 307.3, 307.4, 443, 307.7, 500, 323; 264/570; 249/65, 127, 112; 425/DIG. 44, 339, 342.1, 389, 405.2, 389, 174

[56] References Cited

U.S. PATENT DOCUMENTS

| | | | |
|---|---|---|---|
| 2,363,933 | 11/1944 | Bendix | 156/382 |
| 2,423,647 | 7/1947 | Gurvitch | 156/285 |
| 3,614,811 | 10/1971 | Johnson | 425/389 |
| 4,334,850 | 6/1982 | Garabedian | 425/389 |
| 4,418,906 | 12/1983 | Scott | 271/99 |
| 4,541,891 | 9/1985 | Leatherman | 156/294 |

*Primary Examiner*—Merrell C. Cashion, Jr.
*Attorney, Agent, or Firm*—René E. Grossman; Melvin Sharp; Ferdinand M. Romano

[57] ABSTRACT

A manufacturing device has an outer chamber in which a tool is mounted. The tool is shaped to receive a thermoplastic or staged prepreg. The tool has heaters embedded within it. The chamber region between the tool and the inside wall of the chamber is filled with polysilicone polymer and pressurized to a low pressure such as 50 pounds per square inch. To insure prepreg compaction the chamber is then pressurized in the range of 3,000 pounds per square inch. The chamber to insure prepreg compaction is then pressurized and as is the polysilicone polymer to a pressure in the range of 3,000 psi. At the completion of the temperature/pressure cycle, the cured product is removed from the tool.

10 Claims, 2 Drawing Sheets

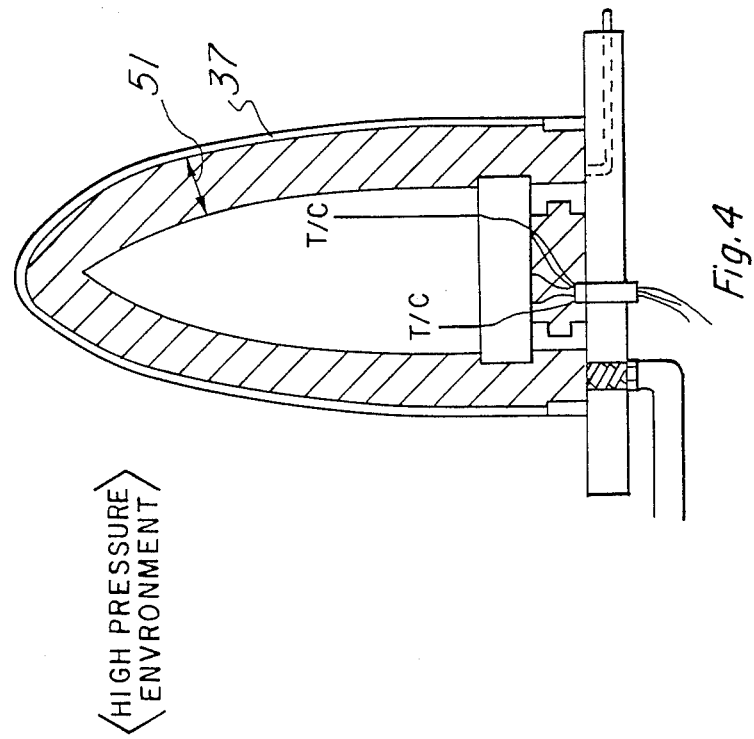
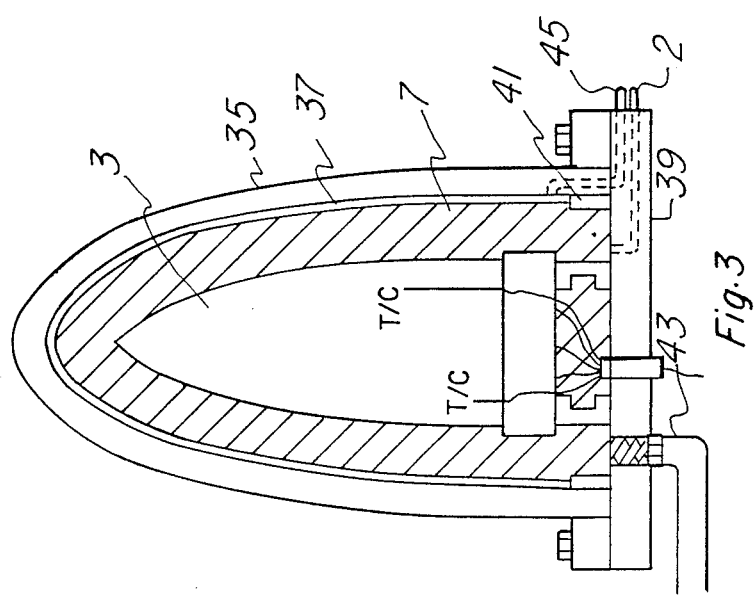

HIGH PRESSURE LAMINATION CHAMBER

This application is a continuation of application Ser. No. 07/103,082, filed 9/30/87, now abandoned.

BACKGROUND OF THE INVENTION

This invention relates to a laminating apparatus and in particular to a high pressure laminating manufacturing apparatus that utilizes high pressure for impregnating a resin or thermal plastic into a prepreg mounted onto a tool.

Since the advent of polysilicone polymer by Dow Corning Corporation of Midland, Mich. and sold under the product numbers of TX-750 or TX-875 there has been progress in the manufacturing of a laminating apparatus. Such an apparatus is manufactured by United Technologies Corporation of Hartford, Conn. The above referenced apparatus uses the TX-750 or TX-875 polysilicone polymer manufactured by Dow Corning Corporation that has the unique qualities of a high thermal coefficient of expansion, poor heat conduction and high compactness. It can be densified into a transparent material having very high viscosity and low flowability when subjected to hydraulic pressures. Thus, when the TX-750 polysilicone polymer is placed under pressure, such as 50 per square inch, the polysilicone polymer molecules adhere to one another and appear to be in a liquid state. This TX-750 polysilicone polymer is then heated and, as is in the case with some liquids, expands, resulting in an increases in pressure, this will cause parts within the thermoclave made of staged prepreg and thermoplastic to have the thermoplastic forced into the staged prepreg and cured from the heat.

The disadvantage in using the above referenced apparatus is due to the excessive specific heat requirements.

SUMMARY OF THE INVENTION

A manufacturing device has an outer chamber in which a tool is mounted. The tool is shaped to receive a thermoplastic or staged prepreg. The tool has heaters embedded within it. The inside of the chamber in the area between the tool and the inside wall of the chamber is filled with polysilicone polymer and which is pressurized at a low pressure. The tool is then heated to soften the thermoplastic prepreg or to enhance the curing of the resin that is on the staged prepreg. The chamber to insure prepreg compaction is then pressurized and as is the the polysilicone polymer to a pressure in the range of 3,000 psi. At the completion of the temperature/pressure cycle, the cured product is removed from the tool.

It is the object of this invention to provide a manufacturing process that enables the molding of thermoplastic or staged prepreg parts having unique and diverse shapes.

It is yet another object of the invention to mold thermoplastic parts in which the resin used to manufacture the parts is embedded under high pressure into the staged prepreg used to shape the part.

It is still yet another object of the invention to provide a manufacturing device that does not require the use of high temperatures to insure the proper penetration of the resin into the staged prepreg or materials having a high thermal coefficient of expansion.

BRIEF DESCRIPTION OF THE DRAWINGS

FIG . 3 is an embodiment of the invention in which a bell chamber and membrane are used to configure the manufacturing apparatus; and FIG. 4 is yet another embodiment of the invention.

DETAILED DESCRIPTION OF THE EMBODIMENTS

Figure 1:
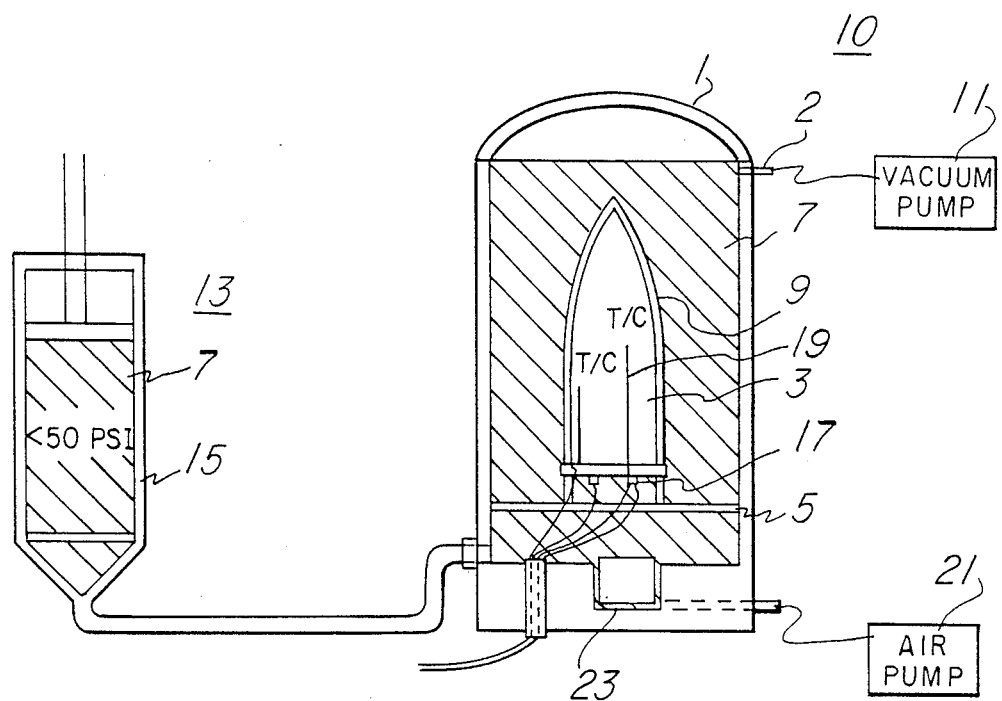
FIG. 1 illustrates an embodiment of the invention in which high pressure air and a piston are used to pressurize the manufacturing apparatus according to the invention.

Referring to FIG. 1, the high pressure lamination device 10 includes an outer high pressure tank 1 in which a tool 3 is mounted on a perforated support member 5 within the pressure tank 1 which is perforated to allow the passage of a polysilicone polymer 7 such as TX-750 or TX-875 polysilicone polymer manufactured by Dow Corning Corporation of Midland, Mich. A vacuum line 9 is connected to a vacuum pump 11 which evacuates the air from the chamber 1. A mechanical compression system shown as a positive displacement piston pump 13 is filled with the polysilicone polymer 7 in a displacement chamber 15 to which a positive pressure of approximately 50 psi is applied to the silicon polymer 7. The positive displacement piston pump 13 is used to compact the polysilicone polymer 7 to remove the voids in the polysilicone polymer 7 from the pressure tank 1 and the displacement chamber 15. At this pressure the granular polysilicone polymer binds together and the voids are eliminated, to create a quasi liquid state. The tool 3 has embedded on it a layer of staged prepreg 9 or thermoplastic prepreg such as F-74 manufactured by Hexcel Corporation or other Fiberglas or quartz gauze. The prepreg 9 is covered with a resin. The prepreg 9 is mounted to the mold 3 which through electrical controls includes a cartridge heater 17 for heating the mold 3 and prepreg 9 and thermocouples 19 for sensing the temperature of the mold 3 and therefore the prepreg 9. The electrical controls heat the mold to a temperature that is specified according to the prepreg material which is in the range of 100° F. to 1000° F. temperature that is measured by the thermocouples and when the desired temperature occurs, high pressure air from an air pump 21 drives a high pressure piston 23 to pressurize the vessel 1 to approximately 3,000 psi. However, this pressure can be as low as 50 psi. This pressure is maintained during the curing process of the resin which can take up to 14 hours, after which time the pressure is reduced so that the polysilicone 7 reverts back to a granular material and the thermal plastic product which is manufactured by this process can be removed from the tool 3. It is also noted that the polymer is a relatively poor thermal conductor. Thus, relatively little heat is transmitted outward from the tool and through the chamber.

Figure 2:
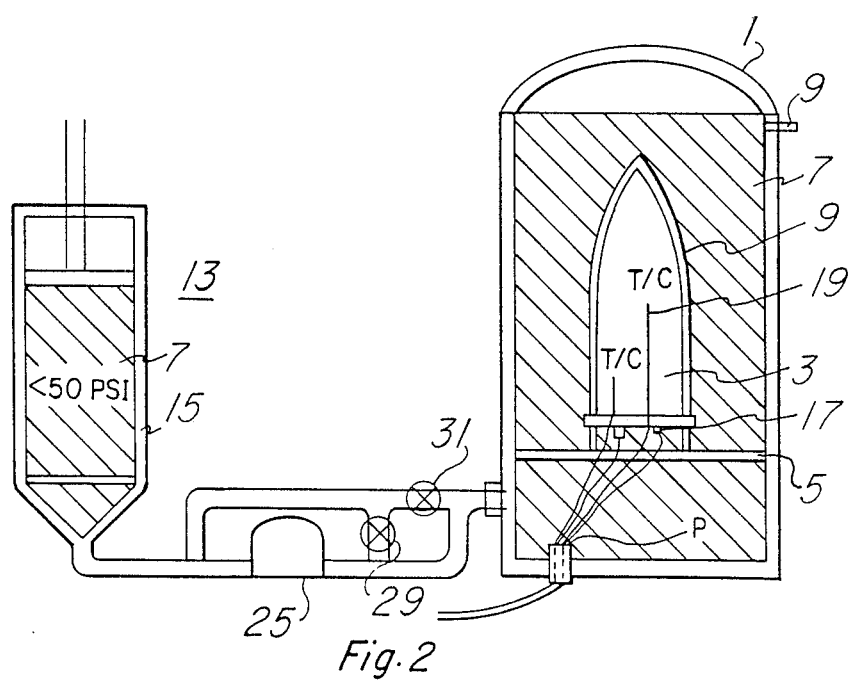
FIG. 2 is a second embodiment of the invention in which a positive displacement gear pump is used to pressurize the manufacturing apparatus according to the invention.

In the embodiment of FIG. 2 the polysilicone polymer is pressurized through the use of a positive displacement gear pump 25 which during the initial pressurization a bypass valve 29 is open. This configuration allows the positive displacement piston pump 13 to pressurize the chamber 1 to 50 psi. At a point determinable from the characteristic temperature/pressure profile of the staged prepreg, the valve 29 is closed and the positive displacement gear pump continues to pressurize the chamber 1 according to the procedure discussed with regard to the embodiment of FIG. 1 until the pressure of approximately 3,000 psi is achieved. A relief valve 31 allows for circulation of the pressure from the chamber 1 through the pump 25 and back into the chamber to thus maintain the desired 3,000 psi.

The embodiment of FIG. 3 is based on the above noted thermal characteristics of the polysilicone polymer 7. Accordingly, a bell chamber 35 is utilized in conjunction with a flexible bag 37. The bag 37, is made of a material such as polysilicone, polyurethane or Buna-N, is mounted to a base plate 39 via bag seals 41. The polysilicone supply is provided from the positive displacement of piston pump 13 via the conduit 43 and the inside of the bell jar 35 is pressurized to 50 psi, turning the polysilicone polymer 7 into a liquid state. This process, of course, as in the embodiment of FIG. 1, is implemented through the use of the vacuum 9. High pressure gas from the air pump 21 is then applied through the high pressure conduit 45 and flows in the space in between the flexible bag 35 and the bell chamber 35 pressurizing the polysilicone polymer 7 against the tool 3 during the curing process.

FIG. 4 illustrates an embodiment similar to FIG. 3 in which the bag 37 is mounted within a high pressure chamber such as is shown in FIGS. 1 and 2 and thus is cured by the addition of heat to the mold 3 and pressure to the flexible bag 37. It should be noted that the separation between the high temperature mold and the thermoplastic bag as indicated by dimension lines 51 need only to be 3.5 inches. This is achievable because of the low thermal conductivity of the polysilicone polymer 7.

I claim:

1. A pressure laminating device comprising:
   - a vessel capable of containing pressurized solid granular material;
   - a shaping tool mounted in the vessel for receiving a resin containing material;
   - a pump for applying a pressure level of up to about 50 psi in the vessel in order to compress the solid granular material against the resin containing material; and
   - a mechanical compression system for further compressing the solid granular material to a pressure level of up to about 3,000 psi and causing the resin containing material to conform to the tool shape.

2. The device of claim 1 whrein the tool includes one or more heating elements for controllably curing the resin containing material at preselected temperatures.

3. The device of claim 1 further comprising a structure mounted to support the tool in the vessel.

4. The device of claim 3 wherein said system includes a movable piston operably positioned to transfer a pressurizing force to the granular material.

5. The device of claim 4 wherein said pump comprises an air pump.

6. The device of claim 1 whrein said pump is pneumatic.

7. The device of claim 1 wherein said pump comprises a positive displacement gear pump.

8. The device of claim 7 wherein the gear pump is an air pump.

9. the device of claim 1 wherein the vessel is a bell chamber.

10. The device of claim 4 wherein the tool is positioned above the support structure and the piston is positioned within the vessel and below the support structure.

* * * * *